United States Patent [19]

Blackstone et al.

[11] 4,106,650

[45] Aug. 15, 1978

[54] ARTICULATED MEMBER FOR HANDLING AND CONTROLLING LOADS

[76] Inventors: Christopher Edward James Blackstone, The Close, Minchinhampton Stroud, Gloucestershire, England, GL6 9JE; Geoffrey Hugh Williams, Cogan, Talboys Walk, Tetbury, Gloucestershire, England, GL8 8YU

[21] Appl. No.: 757,833

[22] Filed: Jan. 10, 1977

[30] Foreign Application Priority Data

Jan. 20, 1976 [GB] United Kingdom ............... 02061/76

[51] Int. Cl.[2] .............................................. B65G 67/00

[52] U.S. Cl. .................................................... 214/750

[58] Field of Search ........................ 214/750, 514, 730

[56] References Cited

U.S. PATENT DOCUMENTS

| | | | |
|---|---|---|---|
| 2,574,045 | 11/1951 | Lapham | 214/750 X |
| 3,070,248 | 12/1962 | Mitchell | 214/750 X |
| 3,709,394 | 1/1973 | Strandberg et al. | 214/750 |
| 3,930,587 | 1/1976 | Bliss | 214/750 X |

*Primary Examiner*—Albert J. Makay

[57] ABSTRACT

Handling and controlling apparatus often use forks or similar devices to support loads. Certain loads, for example packs of flexible sheets, need support over a significant proportion of their lower surface. The resulting forks are then of sufficient size to cause difficulty in handling, requiring excessive clearances around the load. If, however, the fork units are capable of articulation and suitably controlled, then the clearances required may be substantially reduced. This specification describes such an articulated member.

6 Claims, 6 Drawing Figures

ARTICULATED MEMBER FOR HANDLING AND CONTROLLING LOADS

SUMMARY OF THE INVENTION

This invention relates to improvements associated with apparatus for handling and controlling loads. Such apparatus frequently has a body with associated members such as hooks, forks, or similar devices that engage or co-operate with the load. In many cases such members need to be of substantial construction. In these cases the shape of the load, or adjacent objects, or a combination of the two may cause difficulty in bringing an appropriate member, or a plurality of such members, into co-operation with the load.

It is the object of this invention to provide articulated members. As a result of the relative movement of associated portions of such a member the member can be introduced into, or passed through, spaces of limited extent, the said spaces being close or adjacent to the load. Combined with the characteristics stated is the facility that such members, while partly or wholly within the said limited space, may be arranged into a configuration suitable for co-operation with the load and while so arranged be able to exert such forces as may be required to handle or control the load.

According to this invention a load handling and controlling member assembly comprises one or more units of stiff construction, each unit having features that can be brought into engagement with associated features on any adjacent unit, one or more such units having features that can be brought into engagement with associated features on a body of a handling and controlling apparatus, one or more such units having features to co-operate with a load. The features are so arranged as to transmit the forces, arising from handling and controlling the load, to the body of the handling and controlling apparatus.

In a preferred arrangement adjacent units of the handling and controlling member are connected by a mechanism, one or more such units may be connected by a mechanism to the body of the handling and controlling apparatus. The connecting mechanism is so arranged as to allow relative movement between adjacent units and also relative movement between the assembly of units and the body of the apparatus. A regulating mechanism may be provided in order to control the movement of each unit comprising the handling and controlling member and also the movement of the assembly of units relative to the body of the apparatus. The controlling mechanism may be arranged to cause the units comprising the member to move partly or wholly in synchronism with movements of all or part of the handling and controlling apparatus. By this means the articulated member may be caused to move along a chosen path related to the load to be handled or controlled.

DETAILED DESCRIPTION

Figure 1:
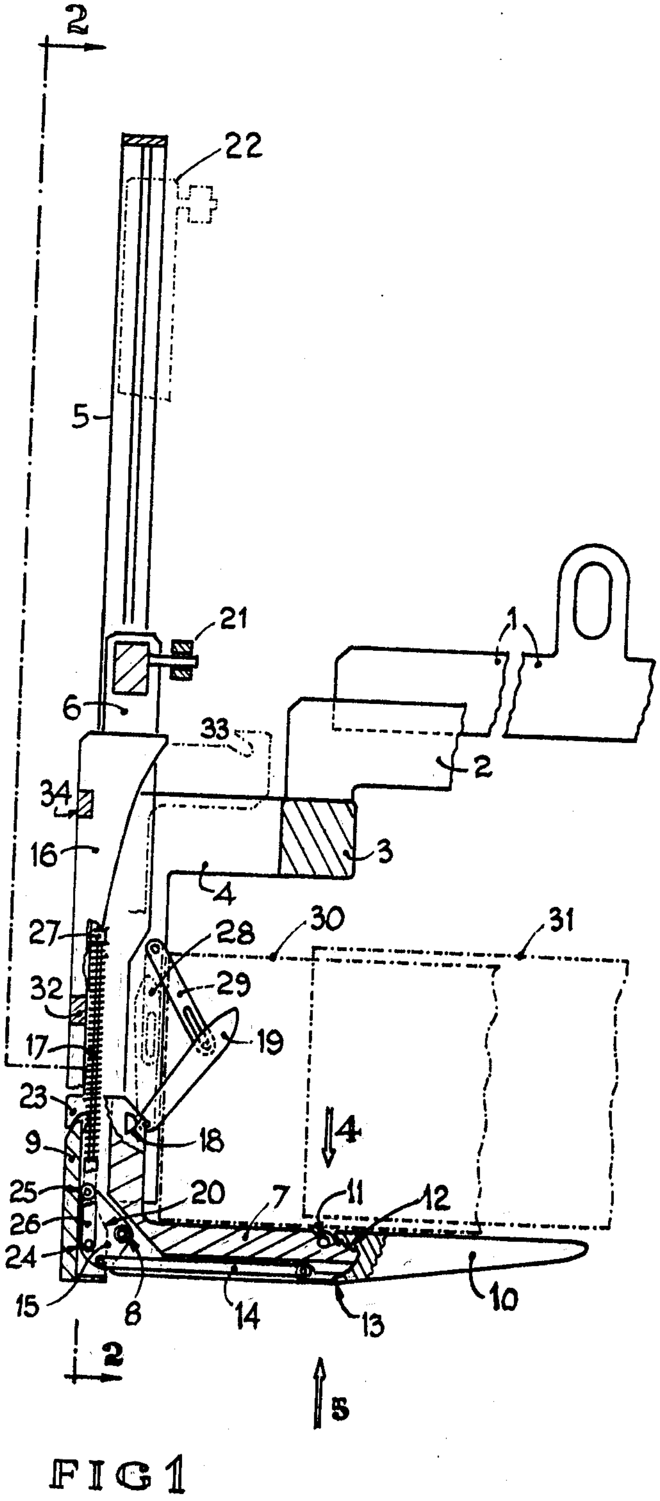
FIG. 1. is an end view primarily showing one articulated member assembly suitably sectioned so as to reveal the general mechanism and construction.
Figure 2:
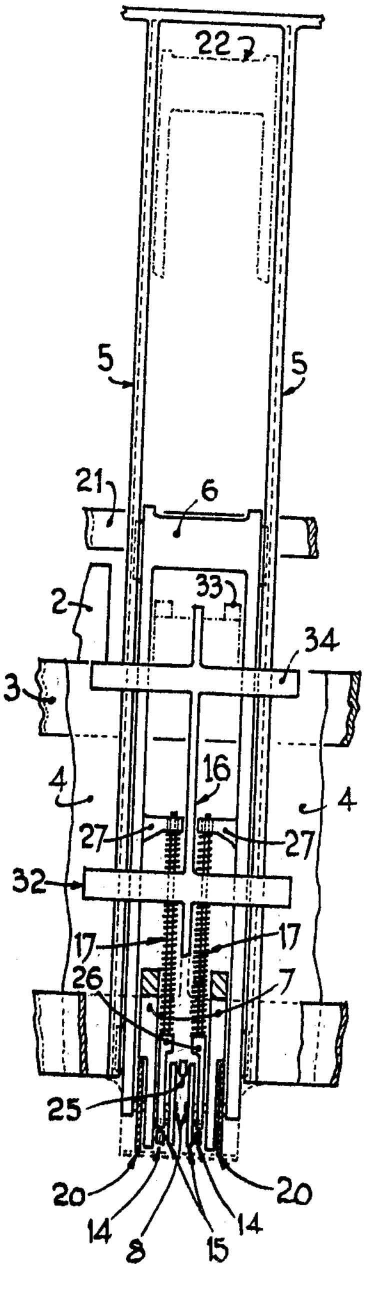
FIG. 2. is a sectional view of FIG. 1. cut along the line marked 2-2 on FIG. 1.
Figure 3:
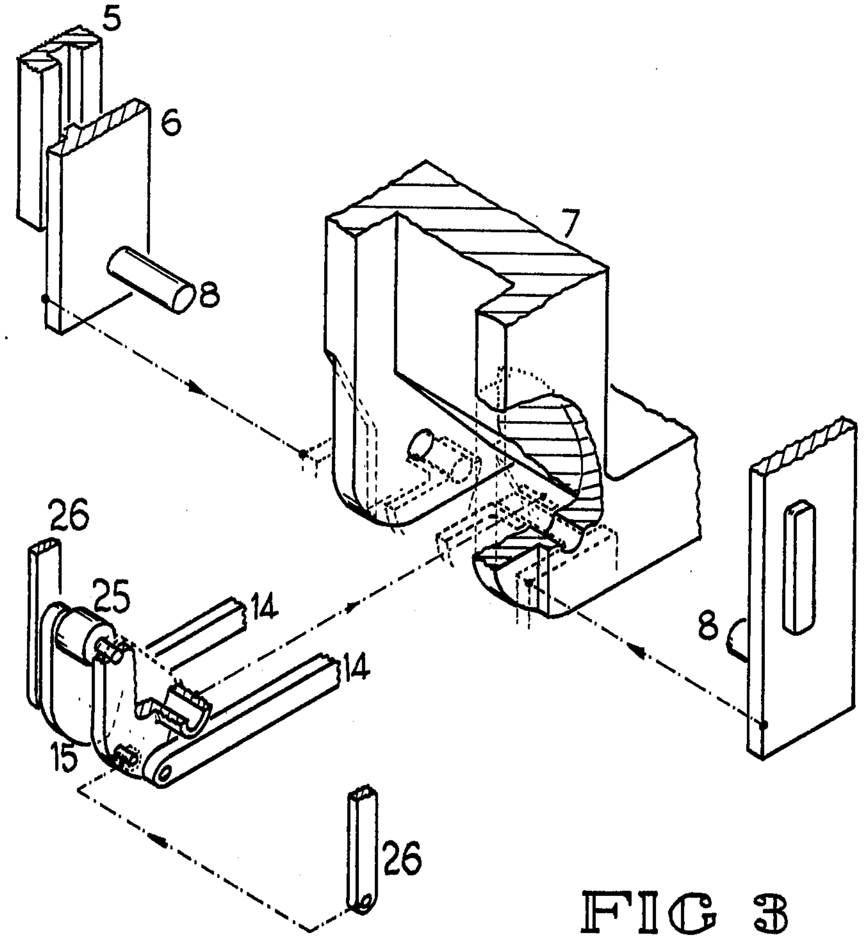
FIG. 3. is an exploded pictorial view of the heel portion of the root member.
Figure 4:
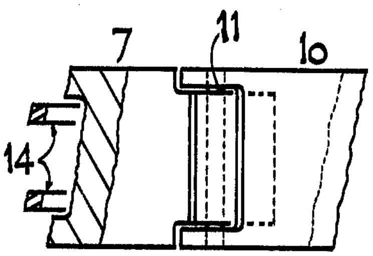
FIG. 4. is a detail part view on arrow 4 marked on FIG. 1.
Figure 5:
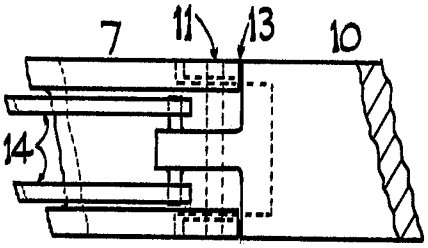
FIG. 5. is a detail part view on arrow 5 marked on FIG. 1.
Figure 6:
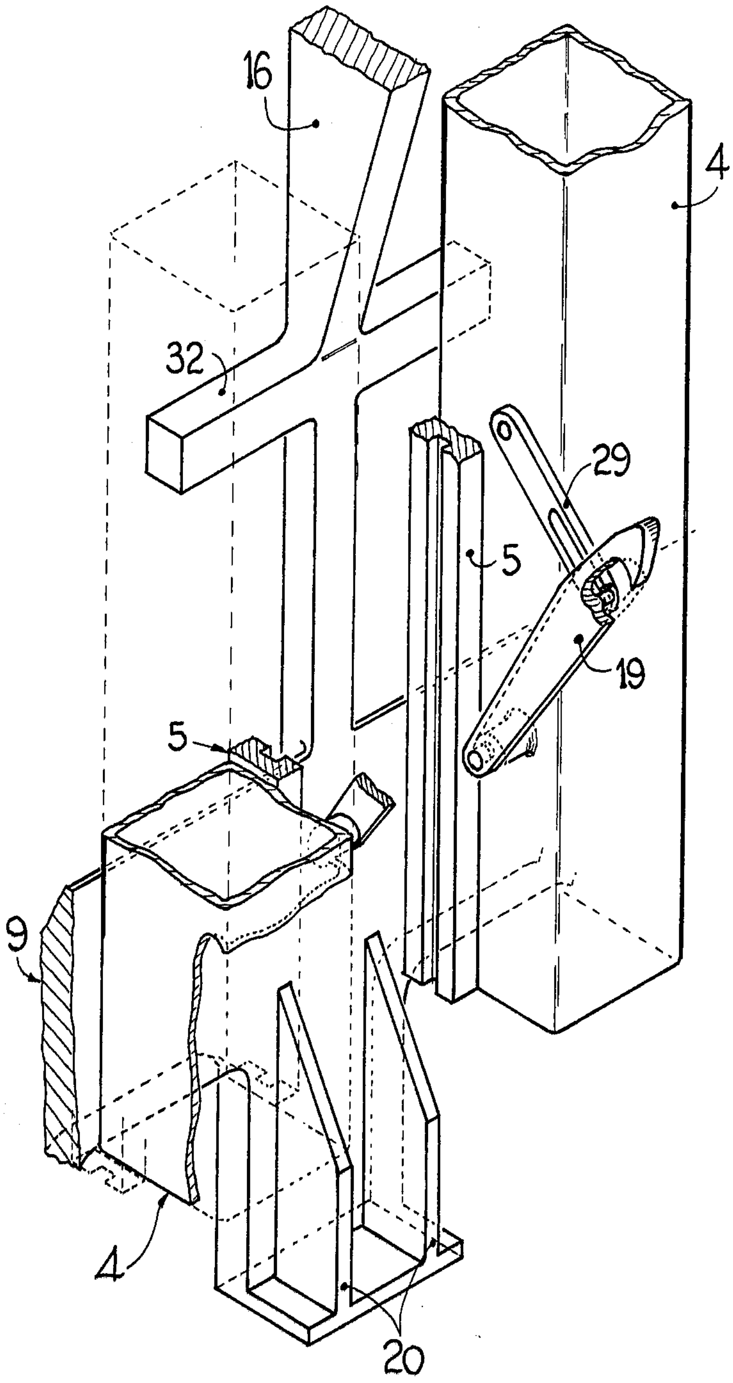
FIG. 6. is a sectioned pictorial view showing the arrangement of the cam assemblies; note the fork members and associated mechanisms have been omitted in order to aid clarity.

Since the articulated member assembly normally forms less than the whole of a device, then for a better understanding, in the first place the application of such a device is described by way of example only.

Should it be required to lift a pack comprising a number of rectangular sheets of a flexible material, the principal plane of the sheets being substantially horizontal, the sheet material will require support over a significant proportion of the lower surface of the stack. A suitable lifting apparatus may comprise a main central body 1 particularly adapted for co-operation with a number of attachments (not shown) connected with a crane or other lifting device.

The main central body assembly 1 could support and control a carriage 2 that is slideably connected to the main central body 1. There is another carriage (not shown) that in combination with carriage 2 forms a pair, said pair being symmetrically disposed about the centre of the main central body 1. Driving and control means are provided such that each carriage 2 may be moved relative to the main central body 1 in a lateral direction, it being taken that the main central body lies in the longitudinal direction. The said driving and control means is so adapted as to maintain the symmetrical disposition of the carriages relative to the main central body. Each carriage 2 supports a beam 3 attached close to the face of the carriage remote from the main central body. The said beam 3 is disposed in a horizontal plane and substantially parallel to the main central body, that is in a longitudinal direction. There is another beam (not shown) forming a pair with the first noted beam 3. By the controlled movement of the carriages the distance between said beams may be caused to increase or decrease while they remain parallel to each other and parallel to the main central body. Furthermore, the distance between the main central body and either beam remains equal so as to preserve the symmetrical disposition of the assembly.

In order to lift the said pack of flexible sheets the lifting apparatus can be moved to a position such that one beam 3 is close to and substantially parallel to one side (hereafter called the first side) of the said pack, preferably a longer side, and the other beam moved to a position close to and substantially parallel to a second side of the said pack, the second side being opposite to the first side.

Dependent from each beam may be a number of fork devices that must pass beneath the pack in order to provide the support required for lifting. In order to insert the said forks a free space on both engaging sides of the pack will be required in order to allow access for the forks. The foregoing describes a known device typically entitled a multi-forked pack grab.

Now the extent of the free space on both engaging sides of the pack can with significant advantages be reduced providing the fork devices are constructed in the form of articulated member assemblies.

An articulated member assembly constructed in accordance with the invention will now be described by way of example only.

A fork assembly forms the main part of the articulated member assembly. Other parts comprise the means of attachment to a suitable lifting device and the regulating mechanism.

A suitable lifting apparatus was described above that in part comprised a beam 3 to which a plurality of lifting devices could be attached. The said attachments are in the form of a plurality of legs 4. Attached to said legs 4 are rails 5 specially adapted so as to slideably guide a stirrup member 6. The stirrup member 6 has a feature 21 that engages with any suitable driving means that is capable of moving the stirrup member 6, and parts attached thereto, into any position between that shown and that outlined and annotated 22.

A root portion of the fork member 7 is attached by pivots 8 to the stirrup member 6. A back plate 9 is attached to the said legs 4 and extends continuously so as to connect all the legs 4 existing on the same side of the lifting device. The upper boundary of said back plate 9 is so adapted as to co-operate with a feature 23 formed as part of the root portion 7 of the fork assembly. The lower boundary of said back plate 9 is so formed as to provide a degree of protection to the fork assembly, support the cam plates 20, and support the lower part of the root portion 7.

When the fork assembly is in the load-carrying position (as shown) the root portion 7 is supported by the back plate 9 by means of features 23 and an abutting contact in the region of point 24. By this means pivot 8 is relieved of forces that could otherwise be induced by the working loads.

The tip portion 10 of the fork assembly is attached by a pivot 11 to the root portion 7. When the tip portion 10 is in the load-carrying position, as shown, a system of buttress teeth 12 interlock and abutment faces 13 make contact. Both the root portion 7 and the tip portion 10 have provided said teeth and abutment faces; these are so arranged as to co-operate. By this means the forces arising from handling the load can be transmitted by the joint without causing a significant load to be impressed upon the pivot assembly 11.

The angular position relative to a horizontal plane adopted by the tip portion 10 is regulated by the combination of links 14 and a follower plate assembly 15. Said links 14 are pivotally connected to said follower plate assembly 15 and the tip portion 10 in the manner shown. Said follower plate assembly is pivotally connected to the stirrup member 6 by the said pivots 8. The angular position relative to a horizontal plane adopted by the follower plate assembly 15 is regulated by the combination of a roller 25 and a spine cam 16 acting as an extension of said back plate 9. Said roller 25 is pivotally connected to the follower plate assembly 15. Said spine cam 16 is held by attachments 32 and 34 fixed to two appropriate legs 4 and the back plate 9. The said spine cam is so arranged that the boundary potentially in contact with roller 25 forms an unstepped continuation of the portion of back plate 9 also traversed by said roller 25. Contact between said roller 25 and the associated track, formed by the combination of back plate 9 and spine cam 16, is maintained by springs 17 abutting links 26, said links being pivotally connected to the follower plate assembly 15 as shown. Said springs 17 are restrained by abutments 27 and stabilised by extensions of links 26. The abutments 27 are specially adapted so as to provide guidance for the said extensions of links 26. Said abutments 27 are attached to the stirrup member 6.

The upper part of the said root portion of the fork member 7 has attached thereto a follower device 18. Said follower device is adapted to move along a cam arm 19 when said cam arm is in the position shown. Contact between the follower device 18 and cam arm 19 is maintained by forces arising from the weight of the fork assembly. Said cam arm 19 is pivotally connected to an appropriate leg 4 and is free to fold into the position shown as 28 by action of a load moving into an abutting relationship with the legs 4. The working position of the cam arm 19 is regulated by link 29. Said link 29 is pivotally connected to an appropriate leg 4 and has a slot that co-operates with a feature on cam arm 19 to achieve the desired regulation.

The operational sequence of the device will now be described. Since the sequence of engaging the load is the reverse of the sequence for disengaging the load only one sequence need be described, and it is convenient to describe the disengaging sequence.

In this example a pack of sheets is assumed to comprise the load and during lifting it will occupy the position shown as 30. Upon setting down the load on other supports the fork assembly may be lowered clear of the load and partly withdrawn by causing the beam 3 and carriage 2 to move relative to the main body 1. The result will be a movement of the load relative to the fork assembly such that the load takes up the position shown as 31.

The stirrup member 6 is now caused to move from the position as shown towards the position outlined as 22. The cam arm is urged into position 19 by the initial movement of the follower device 18. The motion of the root section 7 is regulated by the motion of pivot 8 and the path taken by the follower device 18 due to contact with the cam arm 19. As the stirrup member 6 rises the root section 7 rises and also rotates, about pivot 8, with such a motion that pivot 11 moves towards back plate 9 along a path that is substantially horizontal. This desired result is achieved by the correct choice of profile of the working surface of the cam arm 19 and the relationship of said arm to the horizontal plane.

As the stirrup member 6 continues moving the described motion of the root section 7 continues until portions of the said root member adjacent to the abutment face 13 comes into contact with the associated cam plates 20. Further movement of stirrup member 6 causes the follower device 18 to move out of contact with cam arm 19 and the cam plates 20 control the final phase of the rotation of the root section 7. Further movement of the stirrup member 6 is not accompanied by further rotation of the root section 7 but only linear motion until the final position 33 is reached. The rotational orientation of the root section 7 is governed by the path of pivot 8 and the abutment provided by the back plate 9 and a support 32.

The movement of the tip portion 10 will now be described, commencing with the initial movement of stirrup member 6, that is from the position as shown.

The arrangement of pivots 8 and 11 working in combination with links 14 and associated pivots prevents relative rotation occurring between the tip portion 10 and the follower plate assembly 15. The first part of the movement of the stirrup member 6 causes an associated movement of pivot 8. However, since the pivot 8 maintains a constant distance from the track followed by roller 25 there is no rotational motion of the follower plate assembly and hence no rotational motion of the tip portion 10. Since at the same time the pivot 11 is moving towards the back plate 9 in the manner described above, the combined effect is that the tip portion 10 is partly withdrawn from beneath the load while the upper surface of the tip portion 10 remains substantially in the horizontal plane.

This manner of movement continues until the roller 25 encounters the inclined portion of the track of the spine cam 16. Further movement of stirrup member 6 then causes rotation combined with linear motion of the tip portion 10 so as to withdraw the said tip portion clear of the load and retract said tip portion to a position between an associated pair of legs 4.

The lifting device can now be withdrawn from the load.

What we claim is:

1. Improvements in load handling equipment of a kind comprising in combination: a lifting frame, a set of legs, means of fixing said legs to said frame, a set of guides, means of fixing said guides to said legs, a set of stirrup members, each said stirrup member being slideably connected to a pair of said guides, a set of root fork members, each said root fork member being pivotally connected to one said stirrup member, a set of tip fork members, each said tip fork member being pivotally connected to one associated root fork member, a set of back plates, means of fixing one said back plate to an adjacent pair of said legs, each said back plate is characterized by a shaped part of one edge, the said root fork member is characterized by a hook shaped extension, when the said root fork member is in an extended position the said hook shaped extension thereon abuts the said shaped part of the said back plate that is associated with that particular root fork member, said abutting contact being defined as the first root abutting contact, in addition a second root abutting contact is made between the said root member and the said associated back plate, said second root abutting contact is in an area removed from the area of the said first root abutting contact, each said root fork member is further characterized by the provision at an extremity, remote from the said back plate when in the extended position, of tooth shaped extensions and a joint abutting face removed from the area of said tooth shaped extensions, each said tip fork member is characterized by a set of tooth shaped extensions and a joint abutting face that match said tooth shaped extensions and joint abutting face of the said associated and said pivotally connected root fork member, when both said root fork member and said associated tip fork member are in the extended position both sets of said tooth shaped extensions are in contact and both said joint abutting faces are in contact, such conjunction of both said tooth shaped extensions and both said abutting faces provide a strong and stiff joint between said tip fork member and said associated root fork member, when said tip fork member and said associated root fork member are displaced from the extended position the accompanying relative rotation, between the said tip fork member and said associated root fork member, about the said pivotal connection causes both the said associated pair of tooth shaped extensions and said associated pair of joint abutting faces to move freely out of engagement.

2. Improvements in said load handling equipment defined in claim 1 and further comprising in combination a cam track, means of fixing said cam track to aforesaid legs, a pivot plate, means of pivotally connecting at the first place said pivot plate to aforesaid associated root fork member, said pivot plate being characterized by a roller device, and resilient means keeping said roller device in contact with said cam track, said pivot plate being further characterized by a second pivotal connection removed from the said pivotal connection in the first place, a link characterized by first and second pivotal connections, the first said link pivotal connection being common with said second pivotal connection on the said pivot plate, the aforesaid tip fork member is additionally characterized by a second pivotal connection removed from the aforesaid pivotal connection whereby the said tip fork member is pivotally connected to the said associated root fork member, said second pivotal connection on said tip fork member is common with said second pivotal connection on said link.

3. Improvements in said load handling equipment defined in claim 2 and further comprising in combination extensions formed on the aforesaid root fork member, a cam arm and link, means for pivotally connecting said cam arm and said link to aforesaid legs, during movement away from the extended position the said extensions on the root fork member maintain slideable contact with the said cam arm.

4. An articulated member assembly as claimed in claim 3 wherein the connecting mechanisms comprise substantially a combination of slideable and pivotable means or comprising pivotable means alone.

5. An articulated member assembly as claimed in claim 4 in which said units are connected by a position regulating mechanism to the said body of the said handling and controlling apparatus.

6. An articulated member assembly as claimed in claim 5 wherein the said position regulating mechanism comprises in combination cam devices pivotally connected to associated link-like devices, the said link-like devices being pivotally connected to the appropriate unit of the said articulated member assembly.

* * * * *